INVENTOR:
EDWARD L. WEED,
BY: Horace S Woodward
ATTORNEY

Feb. 7, 1939.  E. L. WEED  2,146,239
ENCLOSURE DEVICE
Filed July 18, 1938   3 Sheets-Sheet 2

INVENTOR:
EDWARD L. WEED,
BY:
Horace S Woodward
ATTORNEY.

Feb. 7, 1939.     E. L. WEED     2,146,239
ENCLOSURE DEVICE
Filed July 18, 1938     3 Sheets-Sheet 3
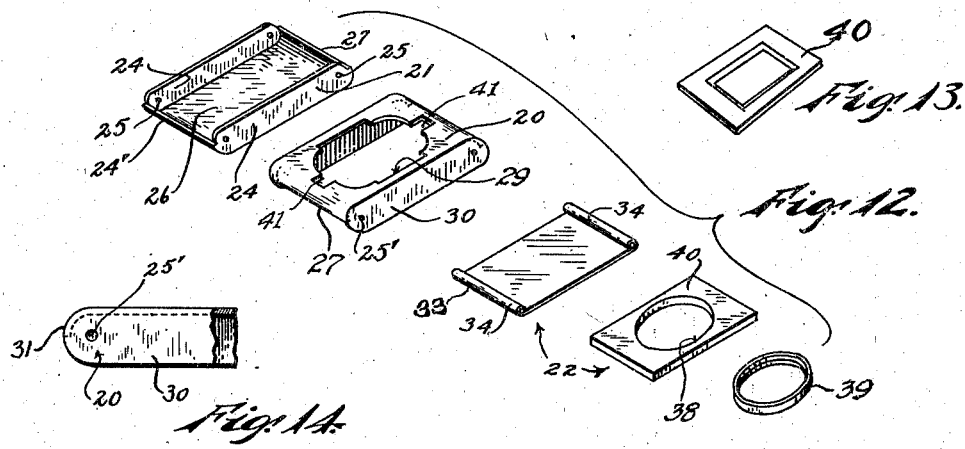
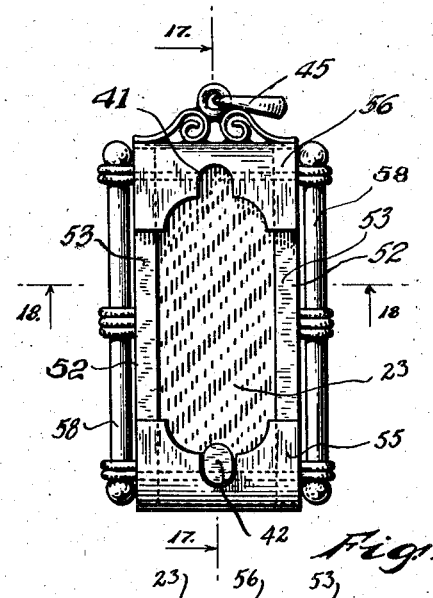
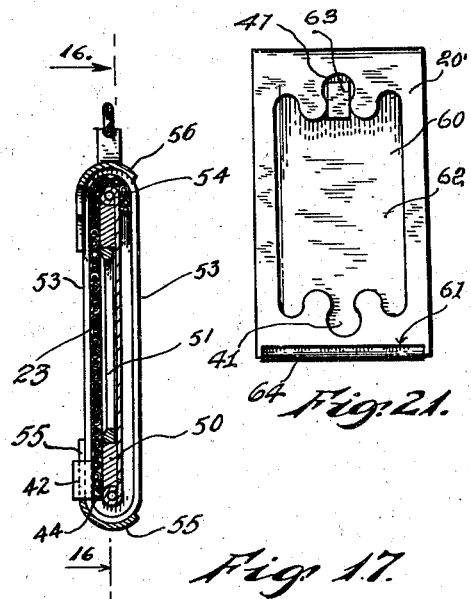
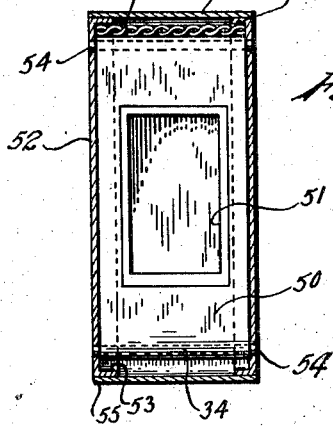
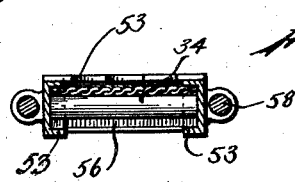
INVENTOR:
EDWARD L. WEED,
BY:
Horace S Woodward
ATTORNEY.

Patented Feb. 7, 1939

2,146,239

UNITED STATES PATENT OFFICE 2,146,239

ENCLOSURE DEVICE

Edward L. Weed, Providence, R. I., assignor to J. J. White Manfg. Co., Providence, R. I.

Application July 18, 1938, Serial No. 219,865

14 Claims. (Cl. 63—18)

The invention relates to jewelry and other articles and particularly to lockets, easels, etc., and has for an object to present a novel slide curtain closure specially adapted to be embodied in a highly ornamental and compact form, and also one which may be worn as a pendant of a necklace, lavalliere, watch fob, and other situation, with a minimum liability of the closure becoming caught by objects external to the locket, or damaged either while open or closed. It is a special aim to obviate the need for hinges in a closure for lockets and the like. Another important object is to obviate the necessity for a large space adjacent the article to accommodate a swinging or sliding cover when open. Another important object is to enable the economical and effective production of the article and its ready plating both of the body and of the closure.

An important object of the invention is to provide a novel curtain closure fabric adapted specially to function in a device of the kind here disclosed.

A further important aim of the invention is to enable the use of a sliding flexible closure for closing a locket and the like without requiring the provision of guide grooves; and also to obviate any need for connecting the ends of the closure to form an endless curtain, or to introduce filler portions between the ends of the curtain to enable its proper operation.

It is also an object to present a novel case and core assembly adapted to be manufactured and assembled at a minimum cost for material and labor.

Additional objects, advantages and features of invention reside in the construction, arrangement and combination of parts involved in the embodiment of the invention, as will appear from the following description and accompanying drawings, wherein Figure 1 is a front elevation of a locket embodying my invention, closed.

Figure 12 is an exploded view of the case and curtain parts in a simple form.

Figure 13 is a detail of a filler frame.

Figure 14 is an edge view of the outer or top case section.

Figure 15 is a view similar to Figure 1 of a modification.

Figure 16 is a view similar to Figure 5 of the modification.

Figure 17 is a longitudinal section of the modification.

Figure 18 is a cross section of the modification.

Figure 21 is a front view of the last mentioned locket.

Figure 1:
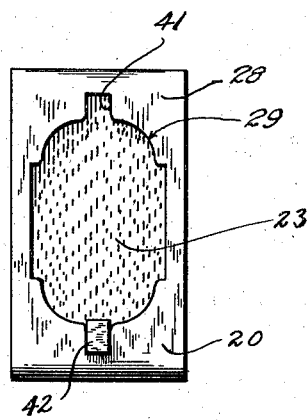
Figure 2:
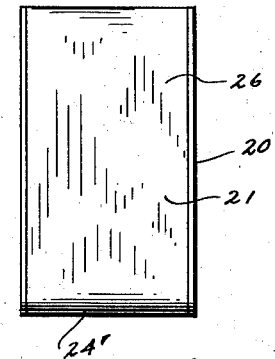
Figure 2 is a back view thereof.
Figure 3:
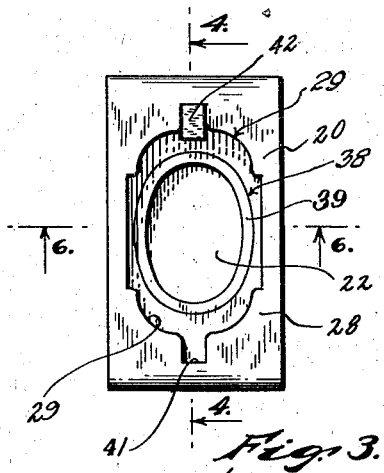
Figure 3 is a front view open.

There is illustrated in Figures 1 to 13 a locket which may be embodied in various ornamental forms and comprises essentially four main pieces or parts requiring to be assembled to form a complete locket, these being front and back case pieces 20 and 21, a core piece 22 and the curtain 23.

The case is substantially in the form of a box, formed of sheet metal including a back section 21 which would correspond to the body of the box, and the front section 20 which fits over the section 21 with parts of the body fitting therewithin. The back section consists of two planiform side plates 24 with semicircular end edges and formed with small apertures 25 concentric with these end edges. A body or back plate 26 is extended between these side plates which may be either integral therewith or attached. The plate 26 is shown as without an opening therein, but if desired, may have one or more openings for ornamentation or for viewing material or objects within the case. The ends 24' of the plate are curved concentrically with the apertures 25, but it should be noted that this curved part 24' is offset or located outwardly of, but against, the outer sides of the curved end edges of the side plates, so that these side plates 24 lie inwardly of a symmetrical projection of the curved plate portion. The upturned ends of the plate 26 stop at a rectilinear transverse edge 27 in the medial major plane of the case, which is coincident with the apertures 25, and form in effect a shoulder across the end of this case section.

The front section 20 is of similar form and includes similar elements, except that the body plate 28 thereof is formed with a view opening 29 usually of ornamental form, and the curved end edges of the side plates 30 thereof are formed on a slightly longer radius from the apertures 25' therein, so as to include or lie flush with the outer face of the back plate 26. The body or face plate 28 of the section 20 also is not offset outwardly of the curved end edges of the side plates but lies flush therebetween, and the end edges 31 of this face plate stop short at the same medial plane of the case and consequently abut flush against the end edges 27 of the back plate 26, and form therewith a substantially continuous semi-cylindrical case surface around each end of the case.

The two sections thus fit snugly together and the apertures 25 and 25' at each end aline with each other. A pin 32 is engaged through the apertures of both sections at each end of the case, each pin extending entirely across the case.

If desired pins may be inserted from each side extending partly through the core.

Figure 4:
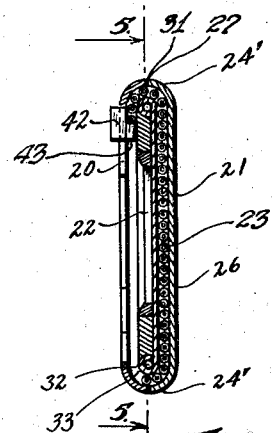
Figure 4 is a longitudinal sectional view of the article.
Figure 5:
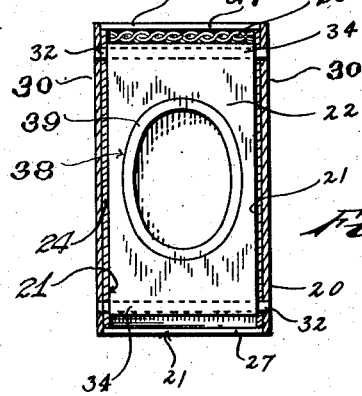
Figure 5 is a longitudinal sectional view in the major medial plane of the article.
Figure 6:
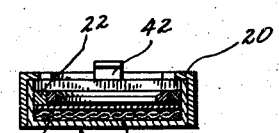
Figure 6 is a cross section mid-length of the locket.
Figure 7:
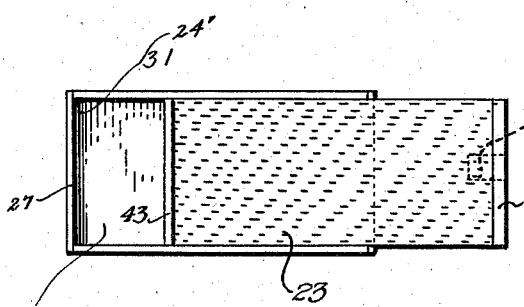
Figure 7 is a view of the first stage of assembly.
Figure 8:
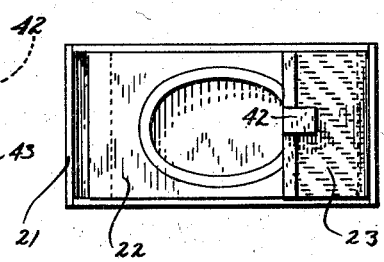
Figure 8 is a view of the second step in assembly.
Figure 11:
Figure 11 is a longitudinal section of a modified core.

Supported on the pins 32 there is a core body 22 fitted snugly between the side plates 24, but spaced entirely and uniformly from all other parts of the case. This core is formed with rounded ends 33 concentric with the pins 32 and apertured to receive the pins 32 properly therethrough, whereby the case parts and core are held in proper assembly, and the latter maintained in uniform spaced relation to the curved end plate portions of the case parts and the back and front plates 26 and 28. As shown in Figures 4 and 5, the core consists of a sheet of thin metal stock with a width to fit snugly between the side plates 24 and having its ends rolled to form integral tubes 34 receiving the pins 32 therethrough. In Figure 11, however, the core is shown as two pieces of tube stock 35, to which are soldered respective ends of a thick plate 36, having a picture opening 38 therein backed as at 37 or not, so that a picture, such as a photograph, may be set therein and a frame piece 39 set in the opening 38 to retain the picture.

In the core piece 22, a rectangular filler 40 may be fitted between the ends 34, having a picture thereon, or cut with an opening as a mat, back of which a picture may be set without the use of any other framing means. The filler may have any of various forms and sizes of openings as required for particular pictures or other articles to be displayed. Glass or other transparent protection material may be included on the filler or applied as discretion dictates. The filler may be considered a part of the core.

A curtain closure 23 of special structure is provided, which is both flexible and resistant to surface wear and to longitudinal compression, as well as having high tensile strength. This curtain requires to be a thickness to fit and fill snugly but slidably the space between the core and the front and back plates of the case, and set loosely between the side plates 24. The opening 29 in the front plate is formed with a central slight longitudinal slot extension 41 at each end, which may be part of ornamental contours of the opening as shown, and on the face of the curtain there is fixed a knob or nib 42 which may be moved into and out of the slot 41 by pressure of the finger nail, to move the curtain. Each end of the curtain includes a suitable cross bar 43, on one of which the nib 42 is secured. The curtain in the present instance is formed of transversely continuous helices of wire, interwoven with next adjacent helices to form a longitudinally flexible but transversely stiff fabric, the wire being of such thickness and the helices of such diameter and interfitting as to abut second helices at their interlinked parts (see Figure 9) and oppose their relative translatory movement longitudinally in the fabric and to restrict the interstices materially against the passage of light. The ends of the wires in the transverse helices need not be specially finished, as they slide continuously adjacent a smooth planiform metal surface of the plate 24, and can not catch thereagainst. If desired, however, they may be turned inward by any usual forming method or apparatus. This curtain may be made up in extensive lengths of stock material of suitable width and cut off into required lengths for particular jobs, the cut edges being properly attached to the cross bars 43 which constitute the ends of the curtain as described. These bars may be U-shaped in cross section and have inturned edges 44 clamped against the interposed curtain material. Solder may be used if desired, to secure the end portions of the curtain and the bars together. The bar 43 may be omitted at the inner end of the curtain if desired. Also, the means for supporting the nib 42 on the curtain instead of the bar 43 may be used.

In the assembly of the locket as described, the back case section 21 is laid open side up on the workman's pallet or other work support and the inner major portion of the curtain laid longitudinally therein with the outer end of the curtain lying without the case, the normally outer side or face of the curtain, on which the nib 42 is located, being face down. The core 22 is then set in place on the curtain in proper operative relation, the outer end of the curtain being then folded inwardly over the core and adjusted in proper operative relation thereto in about three-quarter open position. The front section 20 is then positioned over the assembly and adjusted with its side plates 30 closely without, flush with, and in alinement with the outer face of the body plate 26. The apertures 25 and 25' thus become alined so as to receive the pins 32 therethrough. The curtain at this time serves as a spacer and support for the core so as to facilitate engagement of the pins 32 through the core also, it being possible to manually push the core longitudinally against the curtain so that the proper registration of the tubes 34 with the apertures 25—25' is secured. The pins 32 are then pushed entirely through the assembly and finished. Any desired and appropriate means may be provided for supporting the article assembled as described as a pendant or otherwise, as is well understood in the jewelry and related trades. Customarily, as a locket, an eye piece 45 of appropriate ornamentation is attached to one end of the case.

The case assembly including the curtain may be plated with precious metal before or after assembly as preferred.

In Figures 15 to 18, there is illustrated a modification of the case construction in which a body core 50 is made up either in accord with the above description, or otherwise, in which a picture-receiving recess or opening 51 is formed, and instead of front and back case parts, two identical side members 52 are provided, secured rigidly against the lateral longitudinal edges of the core. These side members are substantially in the form of elongated dished members, each having a continuous circumscribing flange 53 which lies in uniform parallel spaced relation to and partly over the faces and semi-cylindrical ends of the core 50 so as to closely but slidably fit over an edge portion of the curtain 23, made as before described, and laid flat against the core and extending around or partly around one or both ends thereof as described. Two or more pins 54 may be engaged through the side members 52 and core 50 to secure them together. The device in one form may be considered complete in this form, the curtain being made of a length to cover at least one side of the core, and movable to the opposite side when desired with or without a stop means on one end of the core or case parts. In one form the stop means may consist of an ornamental frame piece 55 shaped to and secured on the flanges of the opposed side members. This may be duplicated, or other complementary frame piece 56 secured to the flanges 53 at the opposite end of the article, to form a suitable ornamental framing for the article to be enclosed. The back of the article may be left open between the opposed members 52, or the pieces 55—56 may be one continuous piece closing the back of the article entirely. In the event that the back is left open, the back and front may be made ornamental and in any event, each side may be utilized to hold an object to be viewed alternately with one in the opposite side of the article. When the curtain is moved to open position on one side, the other side is thereby closed, and vice versa. The pins 32 or 54 may be utilized for securing ornamental elements 58 to the case, as indicated in Figure 15.

As described, the device may be used as an alternate display device, one object being displayed at one position of the curtain, and another in the opposite side of the article on the alternate position of the curtain.

It will be understood that other constructions of the curtain than those herein shown may be utilized in the device within the language of the claims, without departing from the spirit of the invention, the essential being that they be flexible longitudinally and resistant to longitudinal compression and freely movable around the ends of the case by pushing or pulling on one end, so that there is no requirement of an endless member or a continuous series of segments throughout the path of the curtain, and that the curtain be resistant to bending transversely.

Figure 10:
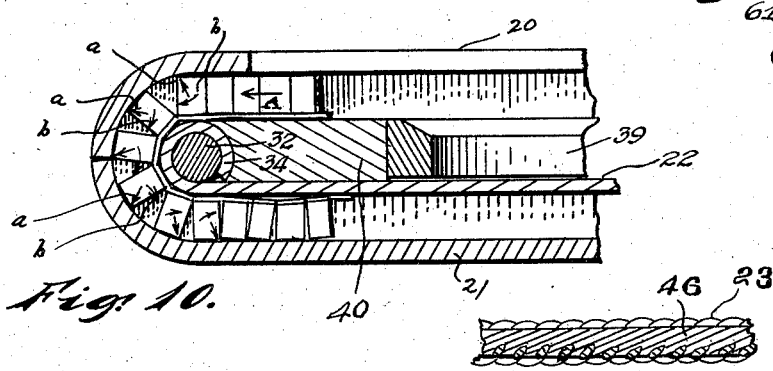
Figure 10 is a similar view showing an attempted adaptation of roll-top cabinet closures in the same passage.
Figure 19:
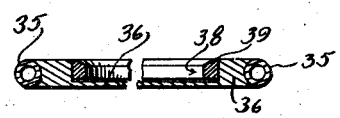
Figure 19 is a longitudinal section of a portion of rubber-impregnated closure material made in accordance with my invention.

It should be understood that in a small device of this character it has been found impracticable to use rigid transverse bars cemented to a fabric sheet at the inner sides because they have been found to jam in the slide-ways provided for its movement at the point of turning. Such a short bend and the requirement of form in the transverse elements cause the parts to assume such mutual relation, and the point of application of the pushing force from one element to another is such that on the short turn essential to enable successful use in jewelry the parts become jammed between the supporting surface at the inner side and that at the other side of the curtain. This is shown in Figure 10. It is further an advantage that it is not necessary to form special channels in the side members to enable ready movement or guiding of the parts of the curtain, by reason of the fact that the pivotal axes of mutually adjacent parts of my curtain are variable and little relative turning movement of the mutually adjacent link parts is required in their accommodation to the bent path.

Figure 9:
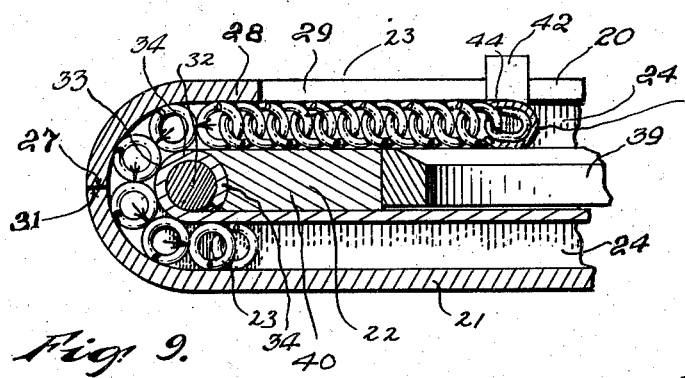
Figure 9 is a longitudinal sectional detail of the curtain in the bend of the curtain passage of the locket, enlarged sixteen diameters as compared to the actual manufacture.

In the use of the intermeshed helices, the transmission of pushing force longitudinally is communicated from the periphery of one helix to the periphery of the second one beyond, counting the connecting coil which is inserted through both as the first. At present the fabric is made up of simple spiral helices which initially are circular as viewed from the end, each having convolutions engaged through respective convolutions of two next adjacent coils, so that one turn of each two mutual adjacent and peripherally abutting coils is held within one turn of the connecting coil, thoughout the fabric, as shown in Figure 9. After initial assembly or weaving of the stock, it may be suitably pressed to flatten and compact the parts of the helices at the surface of the fabric, if desired, as in Figures 14 to 18. The treatment also includes steps to arrange these flattened parts approximately longitudinally in the fabric, at least at that one side which is to be the outer one.

The helices are customarily formed of coiled wire and assembled by practice which is well understood in the production of fabrics of the general kind. The diameter of the wire and the diameter of the helices is preferably so proportioned that two diameters of the wire nearly or quite equal the interior diameter of the helices as viewed from one end. This minimizes relative longitudinal displacement of the elements of the fabric under alternate tensional and longitudinal compression forces, as well as retaining the easy sliding movement of the curtains by pushing or pulling force.

When a fabric so constructed is engaged in a guide-way of the nature indicated and pressure is applied to one end of the fabric, the innermost helix element to which the pressure is applied is forced against the periphery of the next abutting helix not intermeshed with the first, and the force similarly transmitted through the abutting helix to the next abutting helix, and so on throughout the length of the curtain. The linking helices connecting these first named abutting helices, are in similar abutment throughout the fabric, and similarly transmit any force communicated to them. When a pull is exerted on the end of the fabric, the interlinking of the helices causes them to draw one another along as will be understood.

The peculiarity of the function of this fabric in the bend under pushing force applied at one end of a curtain lies in the fact that the force is not transmitted from one element to another at a fixed point or line of attachment, and the direction of transmission of the force is not fixed with respect to the interacting elements throughout the movement of the curtain. The same is true of pulling force applied at the end of the curtain. The points of contact of the mutually pressing or pulling elements and the direction of transmission of the force is in a plane midway between the faces of the curtain as long as it is in the front or back portion of its part, but as the curtain engages in the curved ways between the core and case parts at the ends of the locket, this point of contact changes, and the direction of pushing force also, as indicated by the arrows in Figure 9, the pressure from one element to another being in a direction most effective for overcoming the small amount of friction occurring between the outer case wall and the elements of the curtain.

On the other hand, assuming the provision of a series of transverse slats cemented at their inner sides to a sheet of flexible fabric of any kind, and fitted to a guide way of identical proportions, the outer parts of these slats engage the outer casing as at arrows *a*, Figure 10, and tend to rotate on these points as indicated by arrows *b*. This presses the next slat in advance more forcibly against the outer casing, at the same time that the outer parts of each slat must travel a multiple of the distance traversed by the inner part at which the pushing force is applied. In addition, in order to accommodate the slats to the curved path, peculiar proportioning of the dimensions of the passage radially of the turn and shaping of surface must be provided for in manufacture to enable the elements to pass at all, which are not involved in my fabric. Of course, the idea occurs to make the elements rounded at the mutually abutting sides, and especially at the outer parts; and possibly to place the fabric through the transverse elements midway between the outer case walls and the core; or to shape the transverse elements appropriately and place the fabric on the outer face of the curtain. These expedients only lessen to some degree or change the obstructing forces illustrated in Figure 10, or introduce others which are excessively obstructive. It does not appear therefore that any prior curtain structure having the corresponding advantages of that disclosed by me is available which has been adapted to the use here disclosed, and provided with the corresponding mounting.

In the production of the curtain stock, as before pointed out, by the selection of wire stock of adequate thickness in proportion to the radius of the helix formed in the elements, the curtain may be so made that optical perception of objects thereunder is prevented. But should a completely opaque curtain be desired, the fabric may be impregnated with a filling of rubber latex, or synthetic rubber 46, of appropriate color, all of which may be removed from the extreme outer surface of the fabric and perhaps to a moderate depth below the top parts of the convolutions exposed at the outer side of the locket, so that a good anti-friction surface is presented at both sides of the curtain, and a good ornamental effect obtained by the exposed metal.

The construction presented results in eliminating the necessity for connecting the curtain in an endless form, or providing filler elements in the open parts in order that the curtain may be moved without jamming, in being pushed or pulled around an extremely short radius bend. In the present embodiment, the band is one in which the radius of the inner side of the path at the bend is less than the thickness of the curtain.

It should be noted that the core is so supported within the case that it is equally distant from the case walls at all parts and throughout, in both forms of the invention illustrated, so that a continuous or endless passage is formed entirely around the core. The curtain is made of a length to extend slightly beyond the view opening in the front of the case adjacent the operating nib 42, and at its opposite or inner end the curtain when in closed position also extends beyond the view opening and partly or fully around the adjacent bend of the guide passage. By having the curtain of good length in this respect, if the case is left open at the back as shown in Figure 17, the back will be symmetrically closed when the front is opened, and the inner end of the curtain may extend an ample distance longitudinally on the back to close the back or a view opening therein or thereon and extend beyond such opening a distance.

Figure 20:
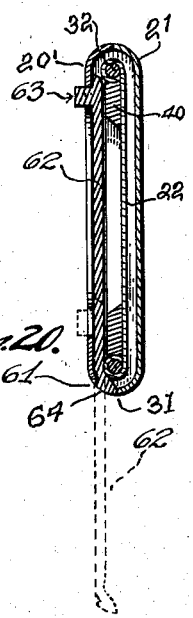
Figure 20 is a longitudinal section of a modified construction of locket.

An approximation of the appearance of the devices of the first described forms may be attained with the use of a sliding solid closure plate 60, as shown in Figures 20 and 21. In this instance the case and core may be constructed identically as first described, with the exception that the front case portion 20' (corresponding to the part 28 before described) is cut away at the lower part to form a slot 61, extending across the end of the case, the edge 31 of the back case section forming one side of the slot.

In the space between the front plate 28 and the core there is slidably fitted a planiform rectangular plate forming a shutter 62, having a knob 63 thereon adapted to set in the upper central slot 41 of the view opening 29, when the shutter is closed, and to lie in the similar slot at the lower end of the case when the shutter is open. The lower end of the shutter is curved inward at 64 and shaped to abut flush against the edge 31 of the back section when the shutter is closed, and approximates a curve similar to a projection of the curved surface of the back. If desired, the front plate 28' may have a slightly incurved part beside the slot 61 adapted to engage upon the curved part of the outer end of the shutter and operate as a yielding detent to hold the shutter closed yieldable to manual pressure on the knob 63.

I claim:—

1. In an article of the character described, a case having an opening in at least one face for viewing the content, a core in the case having outer surfaces parallel to the face portions of the case, and a longitudinally flexible, transversely stiff curtain fabric laid between the core and case and having an operating nib exposed in said opening.

2. In an article of the character described, a case having planiform opposite faces in exceedingly close spaced relation as compared to prior practices with flexible sliding closures, and having curved end portions, and an opening in at least one face, a core in the case having outer surfaces parallel to the said face portions of the case to form a closure passage, and a longitudinally flexible transversely stiff curtain fabric slidable in said passage and comprising transverse interwoven elements, mutually adjacent elements therein having points of abutment and interlinkage connection shiftable between the faces of the fabric under bending when moved longitudinally around said curved parts.

3. An enclosure consisting of a case having at least one open face and curved end, a core body therein having outer surfaces parallel to the named parts of the case, and a longitudinally flexible transversely stiff curtain fabric laid in snugly fitted sliding engagement between case and core, and means to operate the curtain.

4. An enclosure consisting of a back case part having side plates and curved ends, a correspondingly formed top case part having side plates lapping those first named and both having registered apertures longitudinally spaced, the case parts having curved opposed surfaces to form a continuous curved part from front to back, a core piece having surfaces parallel to the front and back and curved parts of the case, and a longitudinally flexible and non-compressible transversely stiff curtain laid between the core and case parts, and closely fitted slidably thereto, and means to operate the curtain.

5. An enclosure consisting of opposed case parts having curved parts and a core body having parts parallel to the case parts to form a curtain channel extending around the case, and connecting members fixed between the case and core parts distant from the channel.

6. An enclosure consisting of opposed case parts and an interposed core body, shaped to form a continuous channel, the case parts including lapping side walls and said core being fitted fixedly between and against the inner of said side walls, fastenings engaged through the side walls and in the core body, and a flexible curtain member slidably fitted in said channel.

7. An enclosure consisting of a core body having opposite flat faces and connecting rounded end surfaces, a recess being formed in at least one face of the core, opposed side case members secured to the longitudinal edges of the core and having flange portions projected inwardly in parallel spaced relation to the faces and surfaces to form a channel, a flexible curtain closure slidable between the core and flanges adapted to lie over said recess at times and movable within the channel from over the recess.

8. The structure of claim 6 in which one of said case parts is a back member having a major back wall portion and having one of said side walls at each side shaped with a semi-circular end edge, the said back wall portion being continued and curved to lie immediately without and joined to the said end edges; the case parts including a front member having a flat front wall portion and having one of said side walls at each side, spaced to lap the first two named side walls, the side walls of the front member being shaped with semi-circular end edges concentric with but of larger radius than the end edges of the first two side walls named, the said front wall being continued and curved to lie inwardly of and flush with said end edges, the end edges of said front and back walls being shaped for snug abutment, whereby a continuous case surface is formed when the front and back wall members are brought together, said core having end surfaces concentric with the curved parts of the front and back walls.

9. An article of the character described comprising a case consisting of parallel face portions and curved end portions, and having side wall portions apertured concentrically with said curved end portions, a core in the case consisting of a sheet fitted between the side walls and spaced parallel to one of said face portions, said sheet having rolled end portions forming passages alined with said apertures and similarly spaced from said curved end portions of the case, assembly pins engaged through said apertures and in the rolled end portions, a filler piece set between said rolled end portions whereby to complete a core equally spaced from both faces and at least one end of the case, and a longitudinally flexible, non-compressible transversely stiff curtain fitted slidably between the core and case, one of said face portions being formed with an opening, and means to operate the curtain.

10. An enclosure consisting of front and back case sections having lapped side portions and pins engaged through the side portions, and a core body for holding articles to be displayed and receiving said pins in assembly relation.

11. The structure of claim 10 in which the core is spaced at least from the front section to form a closure channel, said front section having an access opening, and a closure slidably mounted in said channel.

12. The structure of claim 10 in which the front section is formed with an access opening therethrough, and a closure therefor movably mounted on the case.

13. The structure of claim 10 in which the front section is formed with an access opening, said core being spaced from the front part of said section to form a closure channel, the end of the case being slotted in alinement with the channel, and a closure slidable in the channel movable through said slot, finished to lie with its outer end flush with the case in said slot and projectable therethrough.

14. An article of the character described consisting of a case having a view opening in at least one side thereof, said case having guide portions at opposite sides of the opening and having a continuation of said guide portions away from the mean plane of said opening to accommodate a closure at times, and a sliding closure between said guide portions consisting of a longitudinally flexible transversely stiff fabric, said fabric consisting of longitudinally interlinked members, their mutual connection being shiftable between opposite sides of the fabric in curved parts of the channel.

EDWARD L. WEED.